(12) United States Patent
Zhu

(10) Patent No.: US 12,581,441 B2
(45) Date of Patent: Mar. 17, 2026

(54) COMMUNICATION PROCESSING METHOD, APPARATUS, COMMUNICATION DEVICE, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 325 days.

(21) Appl. No.: 18/269,465

(22) PCT Filed: Dec. 25, 2020

(86) PCT No.: PCT/CN2020/139503
§ 371 (c)(1),
(2) Date: Jun. 23, 2023

(87) PCT Pub. No.: WO2022/134023
PCT Pub. Date: Jun. 30, 2022

(65) Prior Publication Data
US 2024/0323880 A1 Sep. 26, 2024

(51) Int. Cl.
*H04W 56/00* (2009.01)
*H04L 5/00* (2006.01)

(52) U.S. Cl.
CPC ....... *H04W 56/0045* (2013.01); *H04L 5/0048* (2013.01); *H04L 5/0053* (2013.01)

(58) Field of Classification Search
CPC ........... H04W 56/004; H04W 56/0045; H04W 56/005; H04W 56/0055; H04W 56/0065; H04W 72/20–232; H04B 7/1851; H04B 7/18513; H04B 7/18515; H04B 7/1853; H04B 7/18532; H04B 7/18534; H04L 5/0048; H04L 5/0053
See application file for complete search history.

(56) References Cited

U.S. PATENT DOCUMENTS

| | | | | |
|---|---|---|---|---|
| 2021/0105761 A1* | 4/2021 | Cheng | .................... | H04L 5/0053 |
| 2022/0086780 A1* | 3/2022 | Tsai | ..................... | H04W 56/006 |
| 2022/0124660 A1* | 4/2022 | Cheng | .................... | H04W 72/23 |
| 2022/0408384 A1* | 12/2022 | Määttanen | ........ | H04W 74/0833 |
| 2023/0049008 A1* | 2/2023 | Nishio | ................. | H04B 7/1853 |
| 2023/0388007 A1* | 11/2023 | Löhr | ................. | H04B 7/18543 |
| 2024/0236899 A1* | 7/2024 | Xu | ....................... | H04W 56/009 |
| 2024/0313855 A1* | 9/2024 | Yao | .................... | H04B 7/18519 |

OTHER PUBLICATIONS

Vivo, "Discussion on timing relationship enhancements for NR-NTN", Oct. 26-Nov. 13, 2020, 3GPP TSG RAN WG1 #103-e, R1-2007660, pp. 1-4 (Year: 2020).*

(Continued)

*Primary Examiner* — Paul H. Masur
(74) *Attorney, Agent, or Firm* — Cozen O'Connor

(57) ABSTRACT

In a communication processing method, user equipment (UE) sends a timing advance (TA) command. The TA command is configured to trigger a network side to update a timing parameter associated with a transmission delay between a base station and the UE. A base station receives the TA command; and triggers, based on the TA command, to update a timing parameter associated with a transmission delay between the base station and the UE.

19 Claims, 6 Drawing Sheets

| UE | | base station |
|---|---|---|

S81, report the TA command carrying Koffset indication information, in which the Koffset indication information is configured to indicate part or all of a timing adjustment caused by the transmission delay between the base station and the UE

(56) References Cited

OTHER PUBLICATIONS

CMCC, "Discussion on timing relationship enhancements for NTN", Oct. 26-Nov. 13, 2020, 3GPP TSG RAN WG1 #103-e, R1-2008010, pp. 1-5 (Year: 2020).*

Oppo, "Discussion on timing relationship enhancement", Oct. 26-Nov. 13, 2020, 3GPP TSG RAN WG1 #103-e, R1-2008253, pp. 1-4 (Year: 2020).*

Fraunhofer, "Discussion on Timing Relationship Enhancements for NTN", Nov. 2-13, 2020, 3GPP TSG-RAN WG1 e-Meeting #103, R1-2008722, pp. 1-8 (Year: 2020).*

Saarnisaari et al., "Random Access Process Analysis of 5G New Radio Based Satellite Links", Nov. 28, 2019, IEEE, 2019 IEEE 2nd 5G World Forum (5GWF), DOI: 10.1109/5GWF.2019.8911737, pp. 1-5 (Year: 2019).*

European Patent Application No. 20966588.4, Search and Opinion dated Jan. 25, 2024, 9 pages.

Oppo "Discussion on enhancement of UL time and frequency synchronization" 3GPP TSG RAN WG1 #102, R1-2006030, Aug. 2020, 4 pages.

PCT/CN2020/139503, English translation of International Search Report dated Aug. 30, 2021, 2 pages.

Qualcomm Inc. "Enhancements on Timing Relationship for NTN", 3GPP TSG RAN WG1 #102-e, R1-2006804, Aug. 2020, 4 pages.

Huawei et al. "Discussion on timing relationship enhancements for Ntn", 3GPP TSG RAN WG1 Meeting #103-e, R1-2007569, Nov. 2020, 6 pages.

* cited by examiner

COMMUNICATION PROCESSING METHOD, APPARATUS, COMMUNICATION DEVICE, AND STORAGE MEDIUM

CROSS-REFERENCE TO RELATED APPLICATION

This application is a national phase of International Application No. PCT/CN2020/139503, filed on Dec. 25, 2020, the content of which is hereby incorporated by reference in its entirety.

TECHNICAL FIELD

The disclosure relates to, but is not limited to, a field of wireless communication technologies, in particular to a communication processing method, a communication processing apparatus, a communication device, and a storage medium.

BACKGROUND

Currently, the emergence of new Internet applications (e.g., Augmented Reality (AR) or Virtual Reality (VR)) has put increased requirements for speed and latency on wireless communication technology, which drives the continuous evolution of wireless communication technology to meet the needs of applications. Currently, cellular mobile communication technology is in the evolutionary stage of the new generation technology. An important feature of the new generation technology is to support the flexible configuration of multiple service types. Different service types have different requirements for wireless communication technology. For example, the enhanced Mobile Broad Band (eMBB) service type mainly focuses on the requirements of large bandwidth and high speed. The Ultra Reliable Low Latency Communication (URLLC) service type mainly focuses on high reliability and low latency. The massive Machine Type Communication (mMTC) service type mainly focuses on large numbers of connections. Therefore, the new generation of wireless communication system requires flexible and configurable designs to support the transmission of multiple service types.

It can be expected that in the future wireless communication system, the satellite communication system and the terrestrial cellular communication system will gradually achieve deep integration and truly realize the smart connection of everything.

SUMMARY

According to a first aspect of embodiments of the disclosure, a communication processing method performed by a user equipment (UE) is provided. The method includes:

sending a timing advance (TA) command, in which the TA command is configured to trigger a network side to update a timing parameter associated with a transmission delay between a base station and the UE.

According to a second aspect of embodiments of the disclosure, a communication processing method performed by a base station is provided. The method includes:

receiving a timing advance (TA) command; and triggering, based on the TA command, update of a timing parameter associated with a transmission delay between the base station and a user equipment (UE).

According to a third aspect of embodiments of the disclosure, a communication device is provided. The communication device includes:

a processor; and a memory for storing instructions executable by the processor; in which, when the executable instructions are executed by the processor, the processor is configured to implement the communication processing method of any embodiment of the disclosure.

It is understandable that the above general description and the following detailed descriptions are illustrative and explanatory only and are not used to limit embodiments of the disclosure.

DETAILED DESCRIPTION

Figure 1:
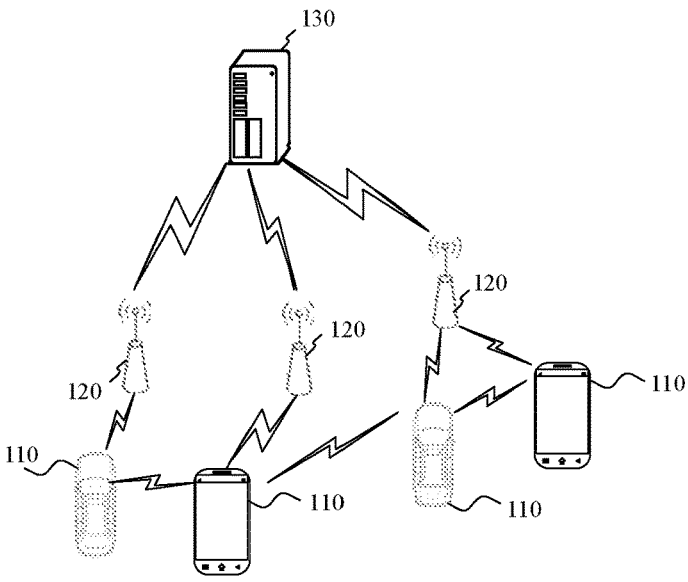
FIG. 1 is a schematic diagram illustrating a wireless communication system.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

The terms used in the disclosure are only for the purpose of describing specific embodiments, and are not intended to limit the embodiments of the disclosure. The singular forms of "a" and "the" used in the disclosure and appended claims are also intended to include plural forms, unless the context clearly indicates other meanings. It should also be understood that the term "and/or" as used herein refers to and includes any or all possible combinations of one or more associated listed items.

It is understandable that although the terms "first", "second", and "third" may be used in the embodiments of the disclosure to describe various information, the information should not be limited to these terms. These terms are only used to distinguish the same type of information from each other. For example, without departing from the scope of the disclosure, the first information may also be referred to as the second information, and similarly, the second information may also be referred to as the first information. Depending on the context, the term "if" as used herein can be interpreted as "when", "while" or "in response to determining".

In wireless communication technologies, satellite communication is considered to be an important aspect of the future development of wireless communication technologies. Satellite communication refers to a communication performed by radio communication devices on the ground using satellites as relays. The satellite communication system includes a satellite portion and a terrestrial portion. Characteristics of satellite communication include: large communication range; capability of carrying out communication between any two points as long as they are within a range covered by electric waves emitted by the satellite; capability of being less susceptible to terrestrial hazards; and high reliability. As a complement to the existing terrestrial cellular communication system, the satellite communication has the following benefits:

extended coverage, for areas that cannot be covered by the existing cellular communication systems or areas with higher coverage costs, such as oceans, deserts, remote mountain areas, etc., satellite communication can be used to solve communication problems;

emergency communication, in the event of a disaster, such as an earthquake, where cellular communication infrastructures are not available, satellite communication can be used to quickly establish communication connections; and provision of industrial applications, for example, for delay-sensitive services over long transmission distances, satellite communications can be used to reduce the transmission delay of services.

It can be expected that in the future wireless communication system, the satellite communication system and the terrestrial cellular communication system will gradually achieve deep integration and truly realize the smart connection of everything. However, due to the high-speed movement of the satellite, the reliability of data transmission in the satellite communication scenario cannot be effectively guaranteed.

Therefore, embodiments of the disclosure provide a communication processing method, a communication processing apparatus, a communication device, and a storage medium.

FIG. 1 is a schematic diagram illustrating a wireless communication system according to an embodiment. As illustrated in FIG. 1, the wireless communication system is a communication system based on cellular mobile communication technology. The wireless communication system may include: a plurality of user equipment (UEs) 110 and a plurality of base stations 120.

The UE 110 may be a device that provides voice and/or data connectivity to a user. The UE 110 may communicate with one or more core networks via a Radio Access Network (RAN). The UE 110 may be an Internet of Things (IoT) UE, such as a sensor device, a cell phone (or "cellular" phone), and a computer with the IoT UE. The UE 110 may also be a stationary, portable, pocket-sized, handheld, computer-built, or vehicle-mounted device, such as, a Station (STA), a subscriber unit, a subscriber station, a mobile station, a mobile, a remote station, an access point, a remote terminal, an access terminal, a user terminal, a user agent, a user device, or a UE. Or, the UE 110 may be an unmanned aerial vehicle device. Or, the UE 110 may be an in-vehicle device, for example, an electronic control unit having wireless communication function, or a wireless UE external to the ECU. Or, the UE 110 can also be a roadside device, for example, a street light, a signal light, or other roadside devices having wireless communication function.

The base station 120 may be a network side device in the wireless communication system. The wireless communication system may be the 4th Generation (4G) mobile communication system, also known as Long Term Evolution (LTE) system. Or, the wireless communication system may also be a 5G system, also known as New Radio (NR) system or 5G NR system. Or, the wireless communication system may be any next generation system of the 5G system. The access network in the 5G system may be called New Generation-RAN (NG-RAN).

The base station 120 can be an evolved base station (eNB) employed in the 4G system. Or, the base station 120 may be a base station (gNB) with a centralized distributed architecture employed in the 5G system. When the base station 120 adopts a centralized distributed architecture, it usually includes a Central Unit (CU) and at least two Distributed Units (DUs). The CU is equipped with the protocol stack of Packet Data Convergence Protocol (PDCP) layer, Radio Link Control (RLC) layer, or Media Access Control (MAC) layer. The DU is equipped with the protocol stack of the physical (PHY) layer, and the specific implementation of the base station 120 is not limited in the embodiment of the disclosure.

A wireless connection can be established between the base station 120 and the UE 110 via a radio interface. In different implementations, the radio interface is a radio interface based on the 4G standard. Or, the radio interface is a radio interface based on the 5G standard, such as a NR. Alternatively, the radio interface may also be a radio interface based on the standard of the next generation of 5G.

In some embodiments, End to End (E2E) connections can also be established between the UEs 110 in scenarios, such as, Vehicle to Vehicle (V2V) communication, Vehicle to Infrastructure (V2I) communication, and Vehicle to Pedestrian (V2P) communication in Vehicle to Everything (V2X) communication.

The above UE may be considered to be the terminal device in the following embodiments.

In some embodiments, the above wireless communication system may also include a network management device 130.

The plurality of base stations 120 are connected to the network management device 130 respectively. The network management device 130 may be a core network device in the wireless communication system, for example, a Mobility Management Entity (MME) in an Evolved Packet Core (EPC). Or, the network management device may be another core network device, such as a Serving GateWay (SGW), a Public Data Network GateWay (PGW), a Policy and Charging Rules Function (PCRF), or a Home Subscriber Server (HSS), etc. The implementation form of the network management device 130 is not limited in the embodiments of the disclosure.

In order to well understand the technical solutions according to embodiments of the disclosure, the timing parameter is explained firstly. In the scenario of satellite communication, there is a long signal transmission distance between a transmitter and a receiver, and thus data transmission takes a long time, which is called the transmission delay. For the transmission (including uplink transmission and downlink transmission), the timing parameter is introduced to compensate for the transmission delay. In an embodiment, the timing parameter includes: a Koffset.

Figure 2:
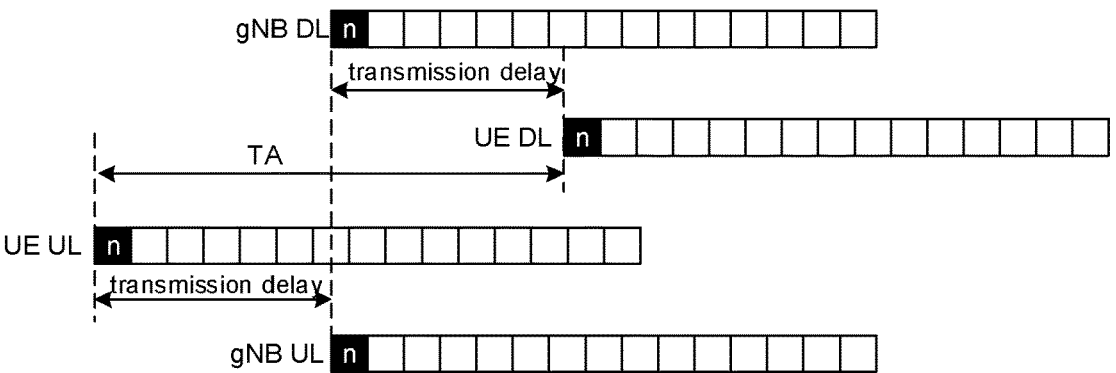
FIG. 2 is a schematic diagram illustrating aligned timing of uplink transmission and downlink transmission at a base station side according to an embodiment.

In some embodiments, the timing of the uplink transmission and the timing of downlink transmission at the base station side are aligned. As illustrated in FIG. 2, the timing of uplink transmission (denoted by "gNB UL") and the timing of downlink transmission (denoted by "gNB DL") at the base station (denoted by "gNB") are aligned, i.e., the frames marked as "n" in the gNB UL and the gNB DL in FIG. 2 are aligned. In FIG. 2, there is a transmission delay between the gNB UL and the downlink transmission of the UE (denoted by "UE DL"). The time advance (TA) of the UE UL needs to take into account the transmission delay from the UE to the satellite, so that different UE ULs can reach the gNB within a preset time range.

Figure 3:
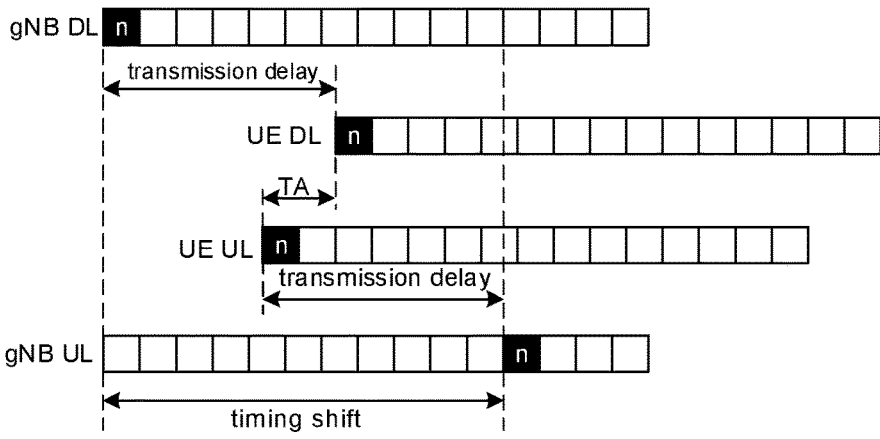
FIG. 3 is a schematic diagram illustrating misaligned timing of uplink transmission and downlink transmission at a base station side according to an embodiment.

In some embodiments, the timing of the uplink transmission and the timing of downlink transmission at the base station side are misaligned. As illustrated in FIG. 3, the timing of gNB UL and the timing of gNB DL at the gNB are misaligned, i.e., the frames marked as "n" in the gNB UL and the gNB DL in FIG. 3 are misaligned, and there is gNB DL-UL frame timing shift. There is a transmission delay between the gNB UL and the UE DL. Similarly, the TA of the UE UL needs to take into account the transmission delay from the UE to the satellite, so that different UE ULs can reach the gNB within the preset time range. In this example, gNB DL-UL frame timing shift is taken into account when determining the TA.

In the related art, if the satellite moves at a high speed, the timing parameter needs to be updated dynamically. However, there is no mechanism to trigger the update of the timing parameter. In this way, the reliability of the data transmission between the base station and the UE in the application scenario that the satellite moves at the high speed cannot be guaranteed.

Figure 4:
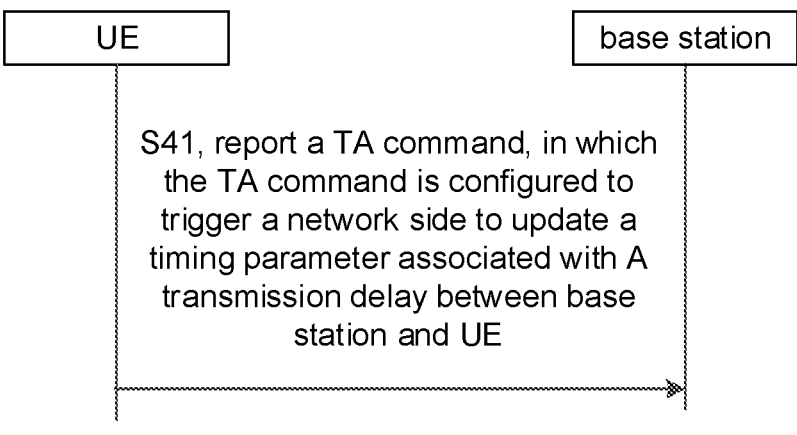
FIG. 4 is a flowchart illustrating a communication processing method performed by a user equipment (UE) according to an embodiment.

As illustrated in FIG. 4, embodiments of the disclosure provides a communication processing method performed by a UE. The method includes the following.

At block S41, a timing advance (TA) command is reported. The TA command is configured to trigger a network side to update a timing parameter associated with a transmission delay between a base station and the UE.

In some embodiments, the timing parameter is caused by the transmission delay between the base station and the UE.

In some embodiments, the UE can be a mobile UE or a location-fixed UE. For example, the UE may be, but is not limited to, a cell phone, a computer, a server, a wearable device, a game control platform, a multimedia device, or others.

In some embodiments, the base station may be any base station. For example, the base station may be, but is not limited to, a three-generation (3G) base station, a fourth-generation (4G) base station, a fifth-generation (5G) base station, or other evolved base stations.

The base station can also be a Terrestrial-Networks base station or a Non-Terrestrial Networks base station.

In some embodiments, the TA command is configured to trigger the network side to update the Koffset of the transmission delay between the base station and the UE.

In some embodiments, the TA command is configured to trigger an entity at the network side to update the timing parameter caused by the transmission delay between the base station and the UE. The entity at the network side herein may be an access network entity or a core network entity, such as a MME in an EPC. Or, the entity at the network side can be a base station or an access point device. The entity at the network side here can be a physical entity or a logical entity.

The communication processing method according to embodiments of the disclosure includes reporting by the UE the TA command to the base station. In this way, in embodiments of the disclosure, the UE can send the TA command directly to the base station. The TA command is the TA command mentioned at the block S41.

The communication processing method according to embodiments of the disclosure includes reporting by the UE the TA command to the base station via a satellite. In this way, in embodiments of the disclosure, the satellite can be used as a relay for communication, which is adaptable to a larger communication range. The TA command is the TA command mentioned in the block S41.

In embodiments of the disclosure, the UE reports the TA command, such that the network side can be triggered to update the timing parameter associated with the transmission delay between the base station and the UE. In this way, the network side can dynamically update the timing parameter caused by the transmission delay between the base station and the UE, i.e., dynamically compensate the transmission delay between the base station and the UE, thereby improving the reliability of the data transmission between the base station and the UE. In particular, it is possible to compensate the transmission delay between the base station and the UE in a scenario that the satellite moves at high speed, and improve the reliability of the data transmission between the base station and the UE in this scenario.

Figure 5:
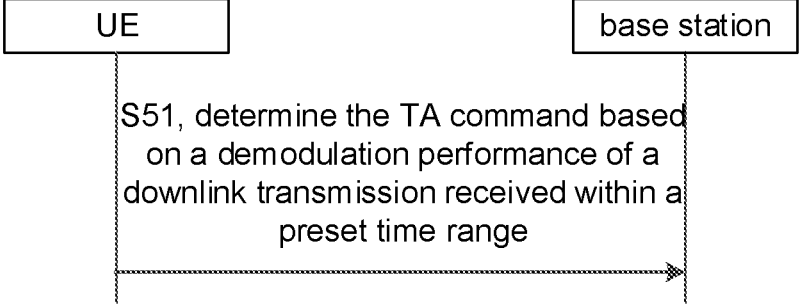
FIG. 5 is a flowchart illustrating a communication processing method according to an embodiment.

As illustrated in FIG. 5, embodiments of the disclosure provides a communication processing method performed by the UE. The method includes the following.

At block S51, the TA command is determined based on a demodulation performance of a downlink transmission received within a preset time range.

In some embodiments, the downlink transmission includes data.

In other embodiments, the downlink transmission includes an instruction.

In an embodiment, the instruction includes a control signaling.

For example, within a time window predefined by the protocol, the UE can receive N instructions and determine that M of the N instructions are incorrectly received. If the UE determines that an error rate of the number of incorrectly received instructions to the number of received instructions within the predefined time window is greater than a preset error rate, then the UE reports the TA command, in which N and M are positive integers and N is greater than or equal to M. In this example, the N received instructions and the M incorrectly received instructions may be used as parameters of the demodulation performance of the downlink transmission.

For example, the UE can receive H data packets within a pre-configured time window and determine that L of the H data packets are correctly received. If the UE determines that a correct rate of the number of correctly received data packets to the number of received data packets within the pre-configured time window is less than a preset correct rate, the UE reports the TA command, in which H and L are positive integers and H is greater than or equal to L. In this example, the H received data packets and the L correctly received data packets can be used as parameters of the demodulation performance of the downlink transmission.

At block S51, the demodulation performance of the received downlink transmission is determined. In some embodiments, the TA command is determined only when the demodulation performance meets a reporting condition (for example, the demodulation performance is equal to or less than a threshold value).

In some embodiments, the preset time range may be fixed or dynamically changed. Therefore, it is understandable that the preset time range may be determined arbitrarily, e.g., by a communication protocol, by a configuration signaling issued by the network side, by negotiation between the UE and the network side, by the UE itself, or by any feasible means, which is not limited in embodiments of the disclosure.

In some embodiments, the TA command may be the TA command mentioned in the block 41, which is not repeated here.

In embodiments of the disclosure, the UE can determine whether to report the TA command based on the demodulation performance of the received downlink transmission, to trigger the network side to update the timing parameter associated with the transmission delay between the base station and the terminal. For example, the TA command is sent when the reliability of the data transmission between the base station and the UE, represented by the demodulation performance, is poor or reduced. Therefore, on the one hand, the reliability of the data transmission between the base station and the UE can be improved, and on the other hand, there is no need for the UE to keep reporting the TA command, thereby reducing the consumption of network resources.

It is understandable that those skilled in the art can understand that the methods according to embodiments of the disclosure can be executed alone or together with some methods in the embodiments of the disclosure or some methods in the related art.

Figure 6:
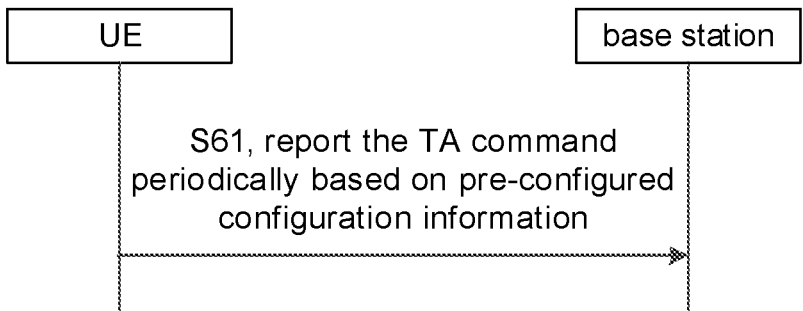
FIG. 6 is a flowchart illustrating a communication processing method according to an embodiment.

As illustrated in FIG. 6, embodiments of the disclosure provides a communication processing method performed by the UE. The method includes the following.

At block S61, the TA command is reported periodically based on configuration information that is pre-configured.

In an embodiment, the configuration information may be determined by a communication protocol, by a configuration signaling issued by the network side, by a negotiation between the UE and the network side, by the UE itself, or by any feasible means, which is not limited in embodiments of the disclosure.

The communication processing method according to embodiments of the disclosure includes periodically reporting the TA command.

In some embodiments, the configuration information includes at least one of the followings:

a reporting period, configured to indicate a period for reporting the TA command;
    an offset parameter, configured to indicate an offset for reporting the TA command;
    a transmission mode, configured to indicate a mode for reporting the TA command;
    a number of transmission, configured to indicate a number of times for reporting the TA command; or a transmission format, configured to indicate a format for reporting the TA command.

In an embodiment, the offset parameter is configured to indicate an offset of a time when the TA command is reported relative to a reference time.

The "reference time" mentioned here can be a time when the UE receives the downlink transmission or a respective start time of each reporting period. The "reference time" mentioned here can be any other time, as long as the time for reporting the TA command can be determined based on the offset parameter.

The "offset" mentioned here is an offset in the time domain. For example, in an embodiment, the offset parameter is configured to indicate a time-domain offset between the time when the TA command is reported and the time when the downlink transmission is received.

The UE may determine, based on the configuration information, time-frequency resource information occupied for reporting the TA command and the transmission mode for reporting the TA command.

The communication processing method according to embodiments of the disclosure includes periodically reporting the TA command based on a reporting period in the configuration information.

For example, the reporting period in the pre-configured configuration information is 1 second. If the TA command is reported at the first second for the first time, then the TA command can be reported at the second second, the third second, . . . and the $N^{th}$ second, in which N is a positive integer.

In some embodiments of the disclosure, the TA command may be the TA command mentioned in the block S41, which is not repeated here.

In the embodiment of the disclosure, the UE periodically reports the TA command, so that the timing parameter caused by the transmission delay between the base station and the terminal can be periodically updated. Therefore, the reliability of data transmission between the base station and the terminal is improved, and meanwhile the network resources used for reporting can be saved and the update of the timing parameters can be regulated.

It is understandable by those skilled in the art that the methods according to embodiments of the disclosure may be performed alone or in combination with some of the methods in the embodiments of the disclosure or some of the methods in the related art.

Figure 7:
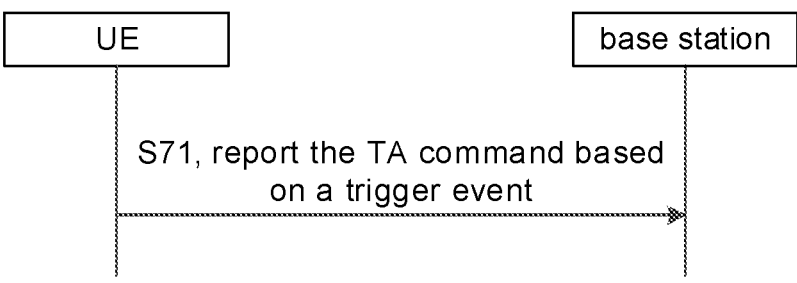
FIG. 7 is a flowchart illustrating a communication processing method according to an embodiment.

As illustrated in FIG. 7, embodiments of the disclosure provides a communication processing method performed by the UE. The method includes the following.

At block S71, the TA command is reported based on a trigger event.

The trigger event can be of various forms. For example, the TA command is reported in response to determining that a demodulation threshold for demodulation is less than a preset threshold. In an embodiment, the preset threshold can be pre-configured by the UE or pre-defined by a standard protocol.

As another example, in response to receiving a trigger instruction from the base station, the TA command is reported. In an embodiment, the UE receives the trigger instruction from the base station, or, the UE receives the trigger instruction from the base station via the satellite.

As still another example, in response to determining that the trigger instruction received from the base station is Downlink Control Information (DCI), the TA command is reported. In some embodiments, a fixed information field or a pre-configured information field of the DCI carries indication information for indicating whether to report the TA command.

In an embodiment, the indication information includes first indication information for indicating to report the TA command; or, second indication information for indicating not to report the TA command.

For example, in the fixed information field or the pre-configured information field of the DCI, 1 bit is used to represent the indication information for indicating whether to report the TA command, in which if the value of the bit is 1, then it indicates that the UE needs to report the TA command, and if the value of the bit is 0, it indicates that the UE does not need to report the TA command. The "1" is the first indication information, and the "0" is the second indication information. As another example, a coding format indicates that the UE needs to report the TA command, while another coding format indicates that the UE does not need to report the TA command. As still another example, the UE needs to report the TA command when the first indication information corresponds to a first parameter, and the UE does not need to report the TA command when the first indication information corresponds to a second parameter.

Certainly, in other examples, in the fixed information field or the pre-configured information field of the DCI, at least 2 bits can be used to represent the indication information for indicating whether to report the TA command. In other embodiments, the first indication information and/or the second indication information can be represented by other values. For example, "01" represents the first indication information, and "10" represents the second indication information.

In embodiments of the disclosure, the UE can report the TA command based on the trigger event. In this way, in embodiments of the disclosure, the UE is triggered to send the TA command only when there is a trigger event, so that the timing parameter brought by the transmission delay between the base station and the UE can be updated. In this way, the resources used by the UE for reporting can be saved, and the timing parameter can be updated in time to improve the reliability of data transmission between the base station and the UE.

For example, the UE can report the TA command when demodulating the received data and/or instructions, when the demodulation threshold is less than the preset threshold, or when receiving the trigger instruction from the base station. In this way, the timing parameter of the transmission delay between the base station and UE can be updated in time, which can improve the reliability of data transmission between the base station and UE, and can be applied to application scenarios of various service types.

In some embodiments of the disclosure, the TA command may be the TA command mentioned in the block S41, which is not repeated herein.

It is understandable by those skilled in the art that the methods according to embodiments of the disclosure may be performed alone or in combination with some of the methods in the embodiments of the disclosure or some of the methods in the related art.

Figure 8:
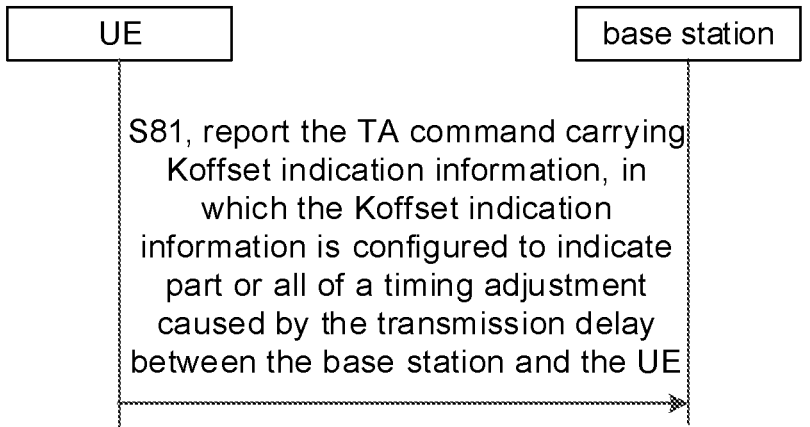
FIG. 8 is a flowchart illustrating a communication processing method according to an embodiment.

As illustrated in FIG. 8, embodiments of the disclosure provides a communication processing method performed by the UE. The method includes the following.

At block S81, the TA command carrying Koffset indication information is reported. The Koffset indication information is configured to indicate part or all of a timing adjustment caused by the transmission delay between the base station and the UE.

The "part or all of the timing adjustment" mentioned here means adjusting some or all of timing parameters caused by the transmission delay between the base station and the UE. Or, the "part or all of the timing adjustment" mentioned here means adjusting some or all of the transmission delays caused by the transmission delay between the base station and the UE.

In some embodiments, "some of the transmission delays" refers to one or more transmission delays.

In other embodiments, "all of the transmission delays" means all subsequent transmission delays, which means all transmission delays in subsequent transmissions between the base station and the UE until there is a new adjustment of the transmission delay.

In some embodiments, "some or all of the transmission delays" means that a part of time or all of time of one transmission delay.

In an embodiment, the Koffset indication information is configured to indicate a Koffset of the transmission delay between the base station and the UE.

The communication processing method according to embodiment of the disclosure includes reporting the TA command carrying the Koffset indication information on resources pre-configured or indicated by the base station.

In an embodiment, the resources include time domain resources, frequency domain resources, or time-frequency domain resources.

In an embodiment, the pre-configured resources may be resources indicated by the base station via a physical layer signaling or resources configured via a high-layer signaling.

In an embodiment, the high-layer signaling includes: a Radio Resource Control (RRC) signaling or a Media Access Control (MAC) Control Element (CE) signaling.

In another embodiment, the physical layer signaling includes: a DCI signaling.

In some embodiments, in response to determining that the TA command is indicated by a preset number of bits, the Koffset indication information includes third indication information for indicating that there is a need to update the timing parameter; or, fourth indication information for indicating that there is no need to update the timing parameter.

In an embodiment, the preset number of bits is 1 bit. For example, if the value of the one bit is 1, it indicates that the timing parameter needs to be updated, and if the value of the one bit is 0, it indicates that the timing parameter does not need to be updated. That is, "1" represents the third indication information, and "0" represents the fourth indication information.

In some embodiments, in response to determining that the TA command is indicated by a number of bits, where the number is greater than the preset number, the Koffset indication information includes indication information in a matching relation with the timing adjustment.

In an embodiment, the timing adjustment includes a Koffset.

The "indication information in a matching relation with the timing adjustment" is therefore the indication information in a matching relation with the Koffset.

In an embodiment, a correspondence between the indication information and the Koffset is predefined or pre-configured. For instance, when the indication information is represented by 2 bits, the correspondence between the indication information and the Koffset is shown in Table 1 below. When the indication information is represented by "00", the Koffset is "0", which means that the Koffset does not need to be updated. When the indication information is represented by "01", the Koffset is "1 ms", which means that the Koffset needs to be updated, and the updated Koffset is 1 ms. When the indication information is represented by "10", the Koffset is "10 ms", which means that the Koffset needs to be updated and the updated Koffset is 10 ms. When the indication information is represented by "11", the Koffset is "20 ms", which means that the Koffset needs to be updated and the updated Koffset is 11 ms.

TABLE 1

| indication information | Koffset |
| --- | --- |
| 00 | 0 (no update is required) |
| 01 | 1 ms |
| 10 | 10 ms |
| 11 | 20 ms |

In this way, in this embodiment, if the Koffset indication information carried in the indication information field includes indication information having a matching relation with the Koffset, the UE can determine, based on the indication information, whether the Koffset needs to be updated and/or the specific value of the updated Koffset.

Certainly, in other embodiments, the correspondence between the indication information and the timing parameter can be predefined or pre-configured. In an embodiment, when the indication information field is greater than the preset number of bits, the Koffset indication information carried in the indication information field includes the indication information having a matching relation with the timing parameter.

In embodiments of the disclosure, the UE can send the Koffset indication information by carrying it in the TA command, so that when the network side is triggered to update the timing parameter brought by the transmission delay between the base station and the UE, the network side (e.g., the base station) can be informed of the specific value of the updated timing parameter. Moreover, by carrying and sending the Koffset indication information in the TA command, the overhead of data transmission can be reduced and the network resources can be saved.

Certainly, in other embodiments, the communication processing method may also include that the UE reports the Koffset indication information. In this way, the UE can report the TA command and the Koffset indication information separately, and can report the Koffset indication information that indicates the specific value needs to be changed for the timing parameter only when it needs to trigger the update of the timing parameter brought by the transmission delay between the base station and the UE, which also saves the network resources to a certain extent.

Certainly, in other embodiments, the communication processing method may also include: determining whether to trigger the update of the timing parameter brought by the transmission delay between the base station and the UE; and in response to determining to trigger the update of the timing parameter brought by the transmission delay between the base station and the UE, reporting the TA command carrying the Koffset indication information. In this way, in this embodiment, the UE can determine whether there is a need to trigger the update of the timing parameter firstly, and reports the TA command carrying the Koffset indication information when the timing parameter needs to be updated. Therefore, the timing parameter brought by the transmission delay between the base station and UE can be effectively updated, and the reliability of the data transmission between the data base station and UE can be improved.

In some embodiments of the disclosure, the TA command may be the TA command mentioned in the block S41, which is not repeated herein.

It is understandable by those skilled in the art that the methods according to embodiments of the disclosure may be performed alone or together with some of the methods in the embodiments of the disclosure or some of the methods in the related art.

It is understandable that the following communication processing method is performed by the base station, which is similar to the description of the communication processing method performed by the UE as described above. The technical details not disclosed in the embodiments of the communication processing method that is applicable to the base station in this disclosure, can be referred to the description of the embodiments of the communication processing method performed by the UE in this disclosure, which will not be described in detail here.

Figure 9:
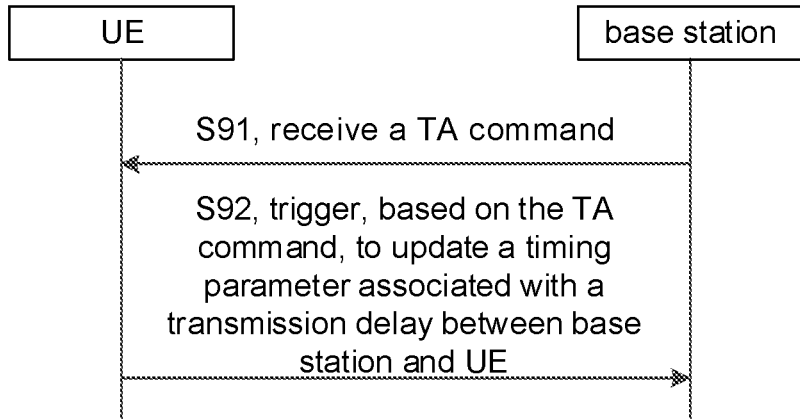
FIG. 9 is a flowchart illustrating a communication processing method performed by a base station according to an embodiment.

As illustrated in FIG. 9, embodiments of the disclosure provides a communication processing method performed by a base station. The method includes the following.

At block S91, a TA command is received.

At block S92, update of a timing parameter associated with a transmission delay between the base station and a UE is triggered based on the TA command.

In an embodiment, the base station receives the TA command sent by the satellite.

In another embodiment, the base station receives the TA command sent by the UE.

In some embodiments, the TA command is determined by the UE based on the demodulation performance of the downlink transmission received within the preset time range.

In some embodiments, the TA command is determined by the UE based on the demodulation performance of data and/or instructions received within the preset time range.

In some embodiments, the TA command is determined by the UE when the demodulation performance of the received downlink transmission satisfies a reporting condition. The reporting condition includes, but is not limited to, that the demodulation performance is less than or equal to a threshold.

The communication processing method according to embodiments of the disclosure includes: receiving the TA command periodically reported, based on pre-configured configuration information, by the UE.

The communication processing method according to embodiments of the disclosure includes receiving the TA command periodically reported by the UE.

The communication processing method according to embodiments of the disclosure includes: receiving the TA command periodically reported, based on a reporting period in the configuration information, by the UE.

The communication processing method according to embodiments of the disclosure includes: receiving the TA command reported based on a trigger event.

The trigger event can be of various forms.

For example, the TA command reported by the UE is received in response to determining that a demodulation threshold used for performing a demodulation by the UE is less than a preset limit.

As another example, the TA command reported, after receiving the trigger instruction, by the UE is received.

The communication processing method according to embodiments of the disclosure includes: receiving the TA command carrying Koffset indication information; and triggering, based on the Koffset indication information in the TA command, update of part of or all of a timing adjustment caused by the transmission delay between the base station and the UE.

The communication processing method according to embodiments of the disclosure includes: receiving the TA command carrying the Koffset indication information on resources pre-configured or indicated by the base station.

In some embodiments, the pre-configured resources may be resources indicated by a physical layer signaling or resources configured via a high-layer signaling.

In an embodiment, the high-layer signaling includes: a RRC signaling or a MAC CE signaling.

In another embodiment, the physical layer signaling includes: a DCI signaling.

In some embodiments, in response to determining that the TA command is indicated by a preset number of bits, the Koffset indication information includes: third indication information for indicating that there is a need to update the timing parameter; or, fourth indication information for indicating that there is no need to update the timing parameter.

In some embodiments, in response to determining that the TA command is indicated by a number of bits that is greater than the preset number of bits, the Koffset indication information includes: indication information in a matching relation with the timing adjustment.

It is understandable by those skilled in the art that the methods according to embodiments of the disclosure may be performed alone or in combination with some of the methods in the embodiments of the disclosure or some of the methods in the related art.

Figure 10:
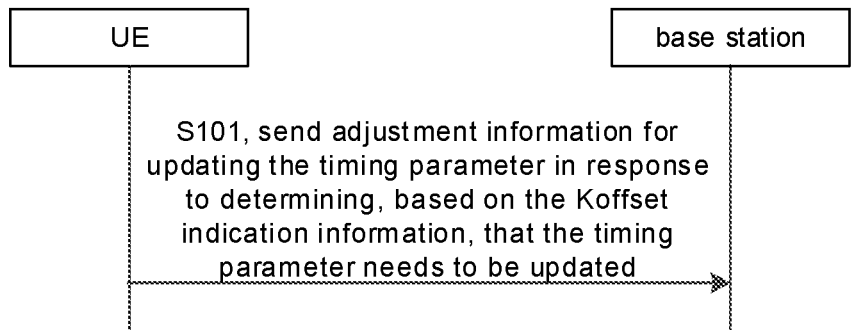
FIG. 10 is a flowchart illustrating a communication processing method according to an embodiment.

As illustrated in FIG. 10, embodiments of the disclosure provides a communication processing method performed by a base station. The method includes the following.

At block S101, in response to determining, based on the Koffset indication information, that the timing parameter needs to be updated, adjustment information for updating the timing parameter is sent.

The communication processing method according to embodiments of the disclosure includes: in response to determining, based on the Koffset indication information, that the timing parameter needs to be updated and determining one UE needs to update the timing parameter, sending a UE specific high-layer signaling or a UE specific physical layer signaling carrying the adjustment information.

The communication processing method according to embodiments of the disclosure includes: in response to determining, based on the Koffset indication information, that the timing parameter needs to be updated, and a group of UEs need to update the timing parameter, sending a high-layer signaling or a physical layer signaling carrying the adjustment information for common information transmission.

The communication processing method according to embodiments of the disclosure includes: in response to determining, based on the Koffset indication information, that the Koffset needs to be updated, and one UE needs to update the Koffset, sending a UE specific high-layer signaling or a UE specific physical layer signaling carrying the adjustment information.

The communication processing method according to embodiments of the disclosure includes: in response to determining, based on the Koffset indication information, that the timing parameter needs to be updated, and a group of UEs need to update the Koffset, sending a high-layer signaling or a physical layer signaling carrying the adjustment information for common information transmission.

In some embodiments, determining whether a UE or a group of UEs need to update the timing parameter includes one of the followings.

When the base station receives the Koffset indication information reported by one UE and the Koffset indication information indicates that the UE needs to update the timing parameter, it is determined that there is one UE needs to update the timing parameter.

When the base station receives the Koffset indication information reported by at least two UEs and at least two pieces of Koffset indication information indicate that at least two UEs need to update the timing parameter, it is determined that there is a group of UEs need to update the timing parameter.

In embodiments of the disclosure, the base station can determine, based on the Koffset indication information reported by the UE, whether the UE needs to update the timing parameter or the Koffset, and determine the adjustment information based on the Koffset indication information, to achieve the update of the timing parameter brought by the transmission delay between the base station and the UE, thereby improving the reliability of the data transmission between the base station and the UE.

In embodiments of the disclosure, it is also possible to determine whether one UE or a group of UEs need to update the timing parameter or the Koffset based on the Koffset indication information reported by multiple UEs, so that the update of the timing parameter can be realized for the base station and each UE in the application scenario. For the case of one UE or the case of a group of UEs, different signaling can be used to send the adjustment information respectively, which realizes flexible configuration for sending the adjustment information.

It is understandable by those skilled in the art that the methods according to embodiments of the disclosure may be performed alone or in combination with some of the methods in the embodiments of the disclosure or some of the methods in the related art.

Figure 11:
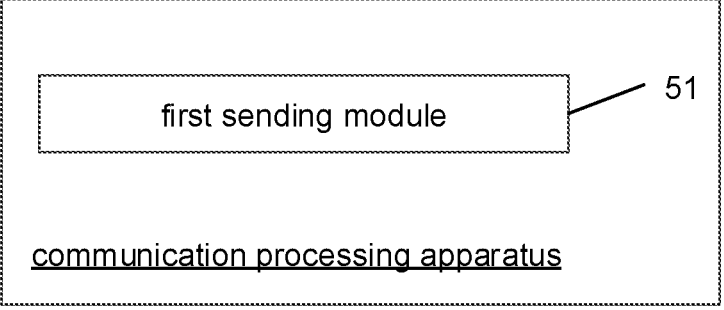
FIG. 11 is a block diagram illustrating a communication processing apparatus applicable to a UE according to an embodiment.

As illustrated in FIG. 11, embodiments of the disclosure provides a communication processing apparatus, applicable to a UE. The apparatus includes a first sending module 51.

The first sending module 51 is configured to report TA command. The TA command is configured to trigger a network side to update a timing parameter associated with a transmission delay between a base station and the UE.

In some embodiments, the first sending module 51 is further configured to: determine the TA command based on a demodulation performance of a downlink transmission received within a preset time range.

In some embodiments, the first sending module 51 is further configured to: report the TA command periodically based on pre-configured configuration information.

In some embodiments, the configuration information includes at least one of the followings:

a reporting period, configured to indicate a period for reporting the TA command;

an offset parameter, configured to indicate an offset for reporting the TA command;

a transmission mode, configured to indicate a mode for reporting the TA command;

a number of transmission, configured to indicate a number of times for reporting the TA command; and a transmission format, configured to indicate a format for reporting the TA command.

In some embodiments, the first sending module 51 is further configured to: report the TA command based on a trigger event.

In some embodiments, the first sending module 51 is further configured to: report the TA command in response to determining that a demodulation threshold for performing a demodulation is less than a preset threshold.

In some embodiments, the first sending module 51 is further configured to: report the TA command in response to receiving a trigger instruction from the base station.

In some embodiments, the first sending module 51 is further configured to: report the TA command in response to determining that the trigger instruction received from the base station is a DCI. A fixed information field or a pre-configured information field of the DCI carries indication information for indicating whether to report the TA command.

In some embodiments, the indication information includes: first indication information for indicating to report the TA command; or, second indication information for indicating not to report the TA command.

In some embodiments, the first sending module 51 is further configured to: report the TA command carrying Koffset indication information. The Koffset indication information is configured to indicate part or all of a timing adjustment caused by the transmission delay between the base station and the UE.

In some embodiments, the first sending module 51 is further configured to: report the TA command carrying the Koffset indication information on resources pre-configured or indicated by the base station.

In some embodiments, in response to indicating the TA command by a preset number of bits, the Koffset indication information includes: third indication information for indicating that there is a need to update the timing parameter; or, fourth indication information for indicating that there is no need to update the timing parameter.

In some embodiments, in response to indicating the TA command by a number of bits that is greater than a preset number of bits, the Koffset indication information includes: indication information in a matching relation with the timing adjustment.

Figure 12:
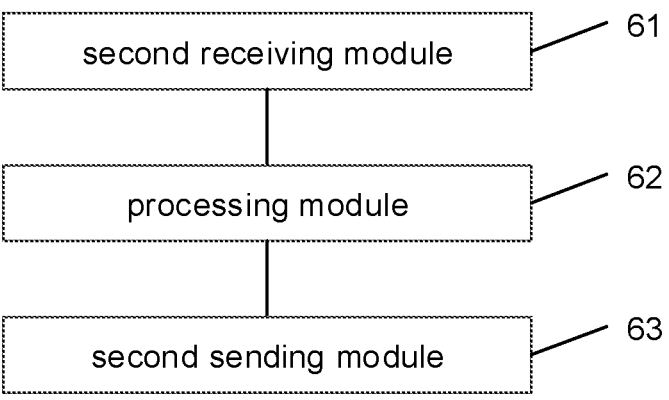
FIG. 12 is a block diagram illustrating a communication processing apparatus applicable to a base station according to an embodiment.

As illustrated in FIG. 12, embodiments of the disclosure provide a communication processing apparatus, applicable to a base station. The apparatus includes a second receiving module 61 and a processing module 62.

The second receiving module 61 is configured to receive TA command.

The processing module 62 is configured to trigger, based on the TA command, update of a timing parameter associated with a transmission delay between the base station and a UE.

In some embodiments, the second receiving module 61 is further configured to: receive the TA command periodically reported, based on pre-configured configuration information, by the UE.

In some embodiments, the second receiving module 61 is further configured to: receive the TA command reported based on a trigger event.

In some embodiments, the second receiving module 61 is further configured to: receive the TA command carrying Koffset indication information.

The processing module 62 is further configured to: trigger, based on the Koffset indication information in the TA command, to update part or all of a timing adjustment caused by the transmission delay between the base station and the UE.

In some embodiments, the second receiving module 61 is further configured to: receive the TA command carrying the Koffset indication information on resources pre-configured or indicated by the base station.

In some embodiments, in response to indicating the TA command by a preset number of bits, the Koffset indication information includes: third indication information for indicating that there is a need to update the timing parameter; or, fourth indication information for indicating that there is no need to update the timing parameter.

In some embodiments, in response to indicating the TA command by a number of bits that is greater than a preset number of bits, the Koffset indication information includes: indication information in a matching relation with the timing adjustment.

In some embodiments, the apparatus includes: a second sending module 63.

The second sending module 63 is configured to send adjustment information for updating the timing parameter in response to determining, based on the Koffset indication information, that the timing parameter needs to be updated.

In some embodiments, the second sending module 63 is further configured to send a UE specific high-layer signaling or a UE specific physical layer signaling carrying the adjustment information in response to determining, based on the Koffset indication information, that the timing parameter needs to be updated and one UE needs to update the timing parameter.

In some embodiments, the second sending module 63 is further configured to send a high-layer signaling or a physical layer signaling carrying the adjustment information for common information transmission in response to determining, based on the Koffset indication information, that the timing parameter needs to be updated and a group of UEs need to update the timing parameter.

Regarding the apparatus in the above embodiments, the specific way in which each module performs its operation has been described in detail in the method embodiments, and will not be described in detail here.

Embodiment of the disclosure provide a communication device. The communication device includes: a processor; and a memory for storing instructions executable by the processor.

When the executable instructions are executed by the processor, the processor is configured to perform the communication processing method according to any embodiment of the disclosure.

The communication device is a UE or a base station.

The processor may include various types of storage mediums. The storage mediums are non-transitory computer storage mediums that are capable of continuing to memorize information stored thereon after the UE is turned off.

The processor may be connected to the memory via a bus or the like for reading executable programs stored on the memory, for example, at least one of the methods shown in FIGS. 4 to 10.

Embodiment of the disclosure also provide a computer storage medium having a computer executable program stored thereon. When the executable program is executed by the processor, the communication processing method according to any embodiment of the disclosure is implemented, for example, at least one of the methods shown in FIGS. 4 to 10.

Regarding the apparatus in the above embodiments, the specific way in which each module performs its operation has been described in detail in the method embodiments, and will not be described in detail here.

Figure 13:
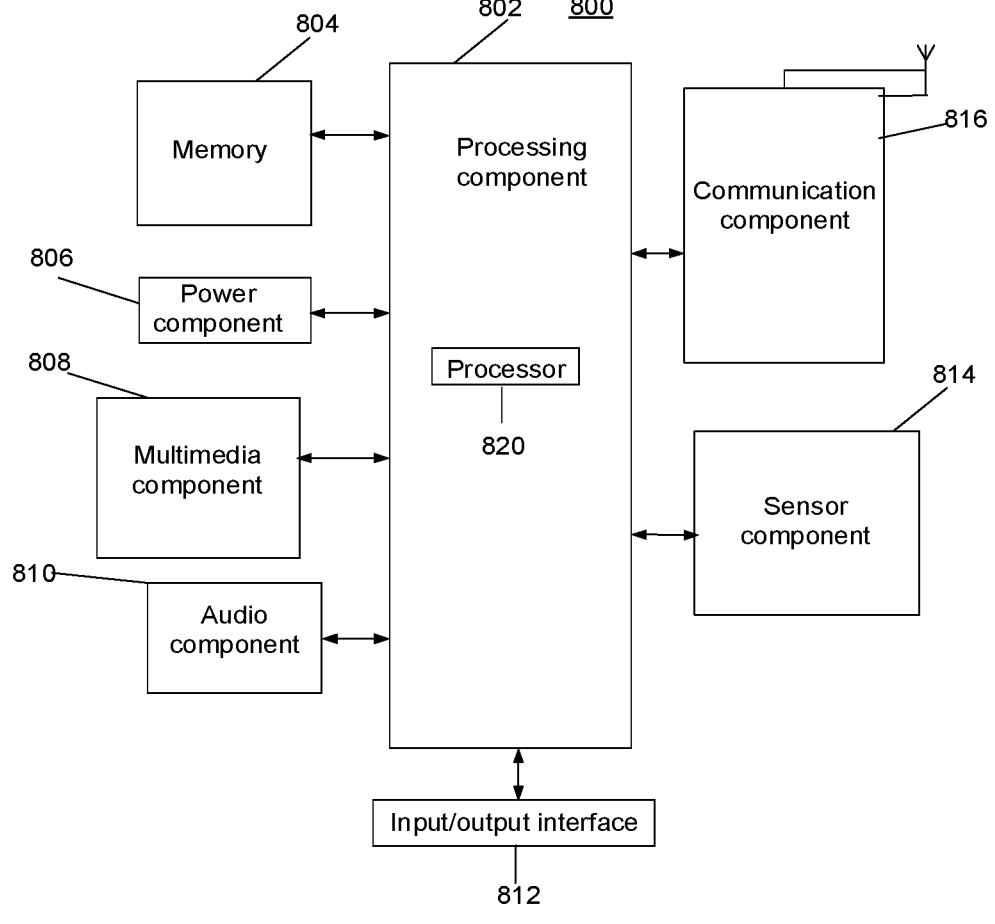
FIG. 13 is a block diagram illustrating a user equipment (UE) according to an embodiment.

FIG. 13 is a block diagram illustrating a UE 800 according to an embodiment. For example, the UE 800 may be a mobile phone, a computer, a digital broadcasting UE, a message transceiver device, a game console, a tablet device, a medical device, a fitness device and a personal digital assistant.

As illustrated in FIG. 13, the UE 800 may include at least one of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to perform all or part of the steps in the above described method. Moreover, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a Static Random-Access Memory (SRAM), an Electrically-Erasable Programmable Read Only Memory (EEPROM), an Erasable Programmable Read Only Memory (EPROM), a Programmable Read Only Memory (PROM), a Read Only Memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a Liquid Crystal Display (LCD) and a Touch Panel (TP). If the screen includes the touch panel, the screen may be implemented as a touch screen to receive input signals from the user. The touch panel includes one or more touch sensors to sense touches, swipes, and gestures on the touch panel. The touch sensor may not only sense a boundary of a touch or swipe action, but also sense a period of wakeup time and a pressure associated with the touch or swipe action. In some embodiments, the multimedia component 808 includes a front-facing camera and/or a rear-facing camera. When the UE 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a Complementary Metal Oxide Semiconductor (CMOS) or Charge-Coupled Device (CCD) image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on a communication standard, such as Wi-Fi, 2G or 3G, or a combination thereof. In an embodiment, the communication component 816 receives a broadcast signal or broadcast associated information from an external broadcast management system via a broadcast channel. In an embodiment, the communication component 816 further includes a Near Field Communication (NFC) module to facilitate short-range communication. For example, the NFC module may be implemented based on a RF Identification (RFID) technology, an Infrared Data Association (IrDA) technology, an Ultra-Wide Band (UWB) technology, a Blue Tooth (BT) technology, and other technologies.

In the embodiments, the UE 800 may be implemented with at least one Application Specific Integrated Circuit (ASIC), Digital Signal Processor (DSP), Digital Signal Processing Device (DSPD), Programmable Logic Device (PLD), Field Programmable Gate Array (FPGA), controller, micro-controller, microprocessor or other electronic components, for performing the above described method.

In the embodiments, there is also provided a non-transitory computer readable storage medium including executable instructions, such as the memory 804, executable by the processor 820 in the UE 800, for performing the above method. For example, the non-transitory computer-readable storage medium may be a ROM, a Random Access Memory (RAM), a CD-ROM, a magnetic tape, a floppy disc, and an optical data storage device.

Figure 14:
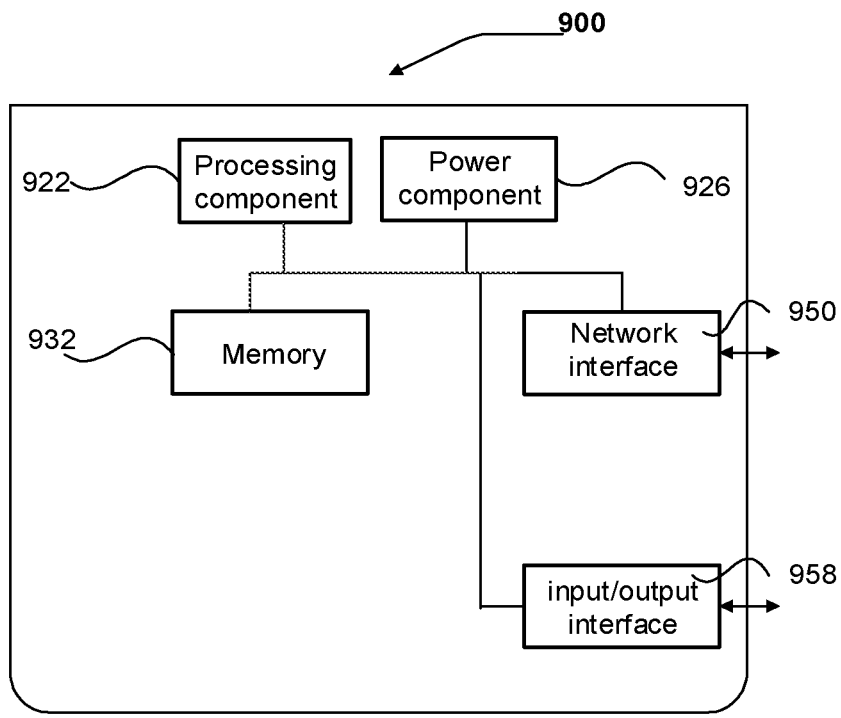
FIG. 14 is a block diagram illustrating a base station according to an embodiment.

FIG. 14 is a block diagram illustrating a base station 900 according to an embodiment. For example, the base station 900 may be provided as a network side device. As illustrated in FIG. 14, the base station 900 includes a processing component 922 consisting of one or more processors, and memory resources represented by a memory 932 for storing instructions that may be executed by the processing component 922, such as applications. The application programs stored in the memory 932 may include one or more modules each corresponding to a set of instructions. In addition, the processing component 922 is configured to execute the instructions to perform any of the methods described above that are applicable to the base station, for example, the methods shown in FIGS. 4 to 10.

The base station 900 may also include a power component 926 configured to perform power management of the base station 900, a wired or wireless network interface 950 configured to connect the base station 900 to a network, and an input-output (I/O) interface 958. The base station 900 may operate based on an operating system stored in the memory 932, such as Windows Server™, Mac OS X™, Unix™ Linux™, FreeBSD™, or the like.

In embodiments of the disclosure, the UE reports the TA command, such that the network side can be triggered to update the timing parameter associated with the transmission delay between the base station and the UE. In this way, the network side can dynamically update the timing parameter caused by the transmission delay between the base station and the UE, i.e., dynamically compensate the transmission delay between the base station and the UE, thereby improving the reliability of the data transmission between the base station and the UE. In particular, it is possible to compensate the transmission delay between the base station and the UE in a scenario that the satellite moves at high speed, and improve the reliability of the data transmission between the base station and the UE in this scenario.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as illustrative only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A communication processing method, performed by user equipment (UE), comprising:
   sending a first timing advance (TA) value before sending a TA command, wherein the first TA value is a last sent TA value;
   determining a variation between a current estimate of a TA value and the first TA value based on the first TA value; and
   sending the TA command, wherein the TA command is configured to trigger a network side to update a timing parameter associated with a transmission delay between a base station and the UE;
   wherein the timing parameter is introduced to compensate for the transmission delay.

2. The method of claim 1, further comprising:
   determining the TA command based on a demodulation performance of a downlink transmission received within a preset time range.

3. The method of claim 1, wherein sending the TA command comprises at least one of:
   sending the TA command periodically based on pre-configured configuration information; or
   sending the TA command based on a trigger event.

4. The method of claim 3, wherein sending the TA command based on the trigger event comprises at least one of:
   sending the TA command in response to determining that a demodulation threshold for performing a demodulation is less than a preset threshold; or
   sending the TA command in response to receiving a trigger instruction from the base station.

5. The method of claim 4, wherein sending the TA command in response to receiving the trigger instruction from the base station comprises:
   sending the TA command in response to determining that the trigger instruction received from the base station is downlink control information (DCI), wherein a fixed information field or a pre-configured information field of the DCI carries indication information for indicating whether to send the TA command.

6. The method of claim 5, wherein the indication information comprises:
   first indication information for indicating to send the TA command;
   or,
   second indication information for indicating not to send the TA command.

7. The method of claim 4, wherein the TA command is determined based on a demodulation performance of a downlink transmission received within a preset time range, the demodulation performance is affected by the variation; and the demodulation threshold being less than the preset threshold comprises that the variation is greater than a corresponding threshold.

8. The method of claim 4, wherein a trigger instruction is an instruction from upper layers.

9. The method of claim 1, wherein sending the TA command comprises:
   sending the TA command carrying Koffset indication information, wherein the Koffset indication information is configured to indicate part or all of a timing adjustment caused by the transmission delay between the base station and the UE.

10. The method of claim 9, wherein sending the TA command carrying the Koffset indication information comprises:
   sending the TA command carrying the Koffset indication information on resources pre-configured or indicated by the base station.

11. The method of claim 9, wherein the Koffset indication information is configured to indicate a value of Koffset, the value of Koffset is greater than or equal to a value of a timing advance (TA) value.

12. A communication processing method, performed by a base station, comprising:
   receiving a first timing advance (TA) value before receiving a TA command, wherein the first TA value is a last sent TA value, and a variation between a current estimate of a TA value and the first TA value is determined based on the first TA value;
   receiving the TA command; and
   triggering, based on the TA command, to update a timing parameter associated with a transmission delay between the base station and user equipment (UE);
   wherein the timing parameter is introduced to compensate for the transmission delay.

13. The method of claim 12, wherein receiving the TA command comprises at least one of:

receiving the TA command periodically sent, based on pre-configured configuration information, by the UE; or receiving the TA command sent based on a trigger event.

14. The method of claim 12, wherein receiving the TA command comprises:

receiving the TA command carrying Koffset indication information;

wherein triggering, based on the TA command, to update the timing parameter associated with the transmission delay between the base station and the UE comprises:

triggering, based on the Koffset indication information in the TA command, to update part or all of a timing adjustment caused by the transmission delay between the base station and the UE.

15. The method of claim 14, wherein receiving the TA command carrying the Koffset indication information comprises:

receiving the TA command carrying the Koffset indication information on resources pre-configured or indicated by the base station.

16. The method of claim 14, further comprising:

sending adjustment information for updating the timing parameter in response to determining, based on the Koffset indication information, that the timing parameter needs to be updated.

17. The method of claim 16, wherein sending the adjustment information for updating the timing parameter in response to determining, based on the Koffset indication information, that the timing parameter needs to be updated comprises at least one of:

sending a UE specific high-layer signaling or a UE specific physical layer signaling carrying the adjustment information in response to determining, based on the Koffset indication information, that the timing parameter needs to be updated and one UE needs to update the timing parameter; or sending a high-layer signaling or a physical layer signaling carrying the adjustment information for common information transmission in response to determining, based on the Koffset indication information, that the timing parameter needs to be updated and a group of UEs need to update the timing parameter.

18. A user equipment (UE), comprising:

a processor; and a memory for storing instructions executable by the processor;

wherein when the executable instructions are executed by the processor, the processor is configured to:

send a first timing advance (TA) value before sending a TA command, wherein the first TA value is a last sent TA value;

determine a variation between a current estimate of a TA value and the first TA value based on the first TA value; and send the TA command, wherein the TA command is configured to trigger a network side to update a timing parameter associated with a transmission delay between a base station and the UE;

wherein the timing parameter is introduced to compensate for the transmission delay.

19. A base station, comprising:

a processor; and a memory for storing instructions executable by the processor;

wherein when the executable instructions are executed by the processor, the processor is configured to perform a communication processing method of claim 12.

* * * * *